Patented Dec. 28, 1937

2,103,461

UNITED STATES PATENT OFFICE 2,103,461

VULCANIZATION OF RUBBER OR OTHER MATERIALS

Alfred Louis Hock, Alfred Kirkham, and Howard Spence, Manchester, England, assignors to Peter Spence & Sons, Limited, Manchester, England.

No Drawing. Application January 6, 1934, Serial No. 705,564. In Great Britain January 12, 1933

6 Claims. (Cl. 106—23)

This invention has reference to the vulcanization of rubber or other materials and to the preparation of siliceous materials in special form for use therein to act as reinforcing agents, fillers, pigments or for other purposes.

It is known that the introduction in a vulcanizable rubber or other mixing of suitable small amounts of certain inorganic basic compounds, such as, for example, magnesium basic carbonate, magnesia, lime, sodium hydroxide or silicate, considerably increases the rate of vulcanization but that the mechanical properties of the vulcanizates prepared from a mixing containing such small amounts of mechanically added basic compounds are usually not very different from those of a vulcanizate made from a corresponding mix containing no such added basic compounds. It is also known that accelerated mixings containing siliceous materials are often characterized by abnormally low rates of vulcanization and that vulcanizates made from such slow-vulcanizing mixings usually possess very poor mechanical properties. This behaviour is especially noticeable in the case of siliceous materials known to possess high adsorptive capacity, such as, for example, colloidal silica.

We have found that products comprising finely divided silica in light form combined or closely associated with a small proportion of alkali (soda or potash) and of low adsorptive capacity, and products comprising finely divided silica in light form combined or closely associated with a small proportion of alkali (soda or potash) and also combined or closely associated with a proportion of magnesia, and in some cases of low adsorptive capacity, are eminently suitable for introduction into rubber or other mixings and that such alkali-containing silica or silica-alkali-magnesia products do not adversely affect the rate of vulcanization, while imparting to the vulcanizates very desirable properties in respect of tensile strength, toughness and hardness.

We may prepare alkali-containing silica products suitable for the purpose of the invention by drying pastes of finely divided silica in light form combined or closely associated with a small proportion of alkali, under regulated conditions of temperature, time and humidity so as substantially to lower their adsorptive capacity. In so preparing the alkali-containing silica products we may take the washed silica products combined or associated with alkali or alkali silicate prepared as described in British patent specifications Nos. 357,993, 294,681 and 299,483 and wash with water or acidic wash until the bulk of the alkali is removed, but leaving products containing, e. g. about 2 to 6% $Na_2O$ expressed on solids. We then dry the products under such suitably regulated conditions of time, temperature and humidity as yield products of substantially low adsorptive capacity, e. g., towards diphenylguanidine dissolved in benzene. In the examples hereinafter given we express adsorptive capacity as the percentage amount of diphenylguanidine adsorbed by one gram of the siliceous product from 50 cc. of a 0.2% solution of diphenylguanadine in benzene at 50° C.

Conditions of high humidity and comparatively high drying temperatures, e. g. 100°–120° C., materially aid the formation of the desired products and we may, for example, dry such alkaline silica pastes as obtained, e. g. from a filter press and containing, e. g., about 16–18% solids, under such conditions of temperature and humidity as give dry products with gradually increasing temperature to 110° C. in a period of about 24 hours. We may with advantage subject the pastes to a preheating treatment by known means, e. g., to about 100° C., for a short time, before introducing them into the dryer and we find that this allows the subsequent drying operations to be carried out under a much wider range of conditions in respect of reduced time and humidity and of temperature and in a more efficient manner, especially in the initial stages. We also find that by concentrating the pastes as far as practicable by any suitable means prior to drying, e. g. by centrifuging, until the solids content is, e. g., about 25% and preferably higher, we can obtain products of lower adsorptive capacity than are otherwise obtainable under similar drying conditions. By suitably combining the preheating and the concentrating operations, we find that the resulting hot concentrated pastes may be dried under a wide range of conditions to yield products suitable for the purpose of the invention.

In the preparation of silica-alkali-magnesia products suitable for the purpose of the invention, we may treat alkali-containing silica pastes as aforesaid in the cold or in the heat, before or after washing, with milk of hydrated magnesia, e. g., equivalent to about 1 molecule MgO to 4 molecules $SiO_2$, and subsequently dry the thus treated pastes as above indicated.

According to another method of preparing the silica-alkali-magnesia products we may treat hot silica solutions in alkali substantially or largely in the form of monocarbonate, prepared e. g. as described in British patent specifications Nos.

357,933, 294,681 and 299,483, with a suitable proportion of milk of hydrated magnesia, e. g. in the proportion of about 1 molecule of MgO to 4 molecules $SiO_2$. The addition is preferably carried out during the cooling of the silica solutions, and suitably at a rate which approximates to the rate of precipitation of the silica. In such manner we obtain complex products in which the magnesia is combined or closely associated with the soda-containing silica precipitated from solution. In the preparation of the milk of magnesia we prefer to employ calcined magnesia prepared under known conditions to give a magnesia of high reactivity. The precipitated materials are separated from their mother liquors by known means and washed to remove as much of the combined or associated soda as desired as previously indicated. The washed products may be dried under any ordinary conditions to yield products suitable for incorporation in vulcanizable mixings but improved materials, especially in respect to tensile strength, stiffness and hardness of vulcanizates, may be obtained by drying the filtered, or otherwise separated, products under suitably regulated conditions of temperature and humidity or after subjecting them to a modified treatment before or during the drying operations, as previously indicated.

The alkali-containing silica and the silica-alkali-magnesia products prepared as indicated may be readily obtained by known means as soft finely divided powders of low bulk density. When incorporated in vulcanizable rubber or other mixings in accordance with the invention, they have little or no retarding effect on, and may even accelerate, vulcanization particularly in the case of mixings containing organic accelerators. The following examples serve to illustrate the incorporation of the alkali-containing silica and silica-alkali-magnesia products prepared as indicated in vulcanizable mixings, the parts being by weight:—

*Example No. 1.*—40 parts of alkali-containing silica product dried under optimum conditions and having an adsorptive capacity of 14.0% on the basis before indicated, were compounded with 100 parts rubber, 5 parts zinc oxide, 3 parts sulphur, 1 part stearic acid and 0.75 part diphenylguanidine. The resulting mix was press vulcanized at 40 lbs. per square inch steam pressure and optimum cure reached in 35 minutes yielding a vulcanizate possessing very desirable properties in respect of tensile strength, stiffness and hardness.

*Example No. 2.*—40 parts of the silica-alkali-magnesia product prepared according to the second of the methods described above and having an adsorptive capacity of 53.0% were substituted for the 40 parts of the alkali-containing silica product of the previous example, the other ingredients and the proportions thereof being the same as in such example. The mix was press vulcanized under 40 lbs. per square inch steam pressure. In this case optimum cure was reached in 27 minutes and yielded a vulcanizate possessing very desirable properties in respect of tensile strength, stiffness and hardness.

*Example No. 3.*—40 parts of the silica-alkali-magnesia product prepared according to the second method described above, and dried under optimum conditions and having an adsorptive capacity of 24.3% were substituted for the 40 parts of the alkali-containing silica product of Example No. 1. The mix was press vulcanized under 40 lbs. per square inch steam pressure, optimum cure being reached in 35 minutes and yielding a vulcanizate having even more desirable properties in respect of tensile strength, stiffness and hardness than the vulcanizates of Examples Nos. 1 and 2.

*Example No. 4.*—40 parts of the silica-alkali-magnesia product prepared according to the second method described above, and dried after subjection of the paste to concentration and preheating and having an adsorptive capacity of 8.3% were substituted for the 40 parts of the alkali-containing silica product of Example 1. The mix was press vulcanized under 40 lbs. per square inch steam pressure. In this case optimum cure was reached in 30 minutes and yielded a vulcanizate also possessing even more desirable properties in respect of tensile strength, stiffness and hardness than the vulcanizates of Examples 1 and 2.

The mechanical properties of vulcanizates containing the improved silica products prepared as indicated are very much superior in respect of tensile strength, stiffness and hardness than those of vulcanizates containing colloidal silica, alone or with the addition of basic compounds mixed mechanically with the dried silica or with the rubber during the mixing process.

It will be appreciated that the particular procedures adopted and/or the proportions of the materials may be varied in many ways without departing from the invention.

What we claim as our invention and desire to secure by Letters Patent is:—

1. The step in the process in the manufacture of vulcanized rubber which comprises introducing in to the composition finely divided silica intimately associated with a small portion of an alkali taken from the group consisting of soda and potash, the combined silica and alkali being of an adsorptive capacity of less than 25% as measured by the amount of diphenyl guanidine absorbed by one gram of the siliceous product from 50 cc. of a 0.2% solution of diphenyl guanidine in benzene at 50° C.

2. The step in the process of manufacture of vulcanized rubber which comprises introducing in to the composition finely divided silica intimately associated with from 2% to 6% of an alkali taken from the group consisting of soda and potash, the combined silica and alkali being of low adsorptive capacity.

3. The step in the process of manufacture of vulcanized rubber which comprises introducing in to the composition finely divided silica intimately associated with from 2% to 6% of an alkali taken from the group consisting of soda and potash, the combined silica and alkali being of an adsorptive capacity of less than 25% as measured by the amount of diphenyl guanidine absorbed by one gram of the siliceous product from 50 cc. of a 0.2% solution of diphenyl guanidine in benzene at 50° C.

4. The step in the process of manufacture of vulcanized rubber which comprises introducing in to the composition finely divided silica intimately associated with from 2% to 6% of an alkali taken from the group consisting of soda and potash and a small portion of magnesia, the combined silica and alkali being of an adsorptive capacity of less than 25% as measured by the amount of diphenyl guanidine absorbed by one gram of the siliceous product from 50 cc. of a 0.2% solution of diphenyl guanidine in benzene at 50° C.

5. A process of preparing siliceous materials suitable for introduction in vulcanizable rubber or other mixings, which comprises adding hydrated magnesia to hot solutions of silica in alkali substantially in the form of mono-carbonate, precipitating the silica in combination or close association with the magnesia, and drying the washed silica-alkali-magnesia pastes.

6. The process of preparing siliceous materials suitable for incorporating in vulcanized rubber and the like which process comprises adding magnesia to the alkali-containing silica paste of finely divided silica in intimate association with a small portion of alkali, and drying the paste to form a product of low adsorptive capacity.

ALFRED LOUIS HOCK.
ALFRED KIRKHAM.
HOWARD SPENCE.